April 19, 1966   C. H. WORSHAM   3,247,085
ELECTROCHEMICAL PROCESS FOR MAKING METHYL-ETHYL KETONE
Filed June 14, 1963

Charles H. Worsham   Inventor

By *W. O. Heilman*

Patent Attorney

United States Patent Office 3,247,085
Patented Apr. 19, 1966

3,247,085
ELECTROCHEMICAL PROCESS FOR MAKING METHYL-ETHYL KETONE
Charles H. Worsham, Fanwood, N.J., assignor to Esso Research and Engineering Company, a corporation of Delaware
Filed June 14, 1963, Ser. No. 287,995
4 Claims. (Cl. 204—80)

This application is a continuation-in-part of Serial Number 121,488, filed July 3, 1961.

This invention relates to a novel process for converting butene-1 to methyl-ethyl ketone. In particular, it relates to contacting butene-1 with sulfuric acid at an anode of an electrochemical cell. In particular, it relates to a process wherein butene-1 is contacted with sulfuric acid at a porous electrode in the presence of a catalyst to produce methyl ethyl ketone without producing fatty acids as by products.

Ketones are produced commercially by the catalytic dehydrogenation of secondary alcohols. Ordinarily, the secondary alcohol feed stock is produced by sulfuric acid hydration of the corresponding olefin. Thus when the ketone is derived from an olefin, two separate processes with intermediate product reactions are required. In the first process, that is for the alcohol production from the olefin, the olefin is adsorbed into a concentrated sulfuric acid solution resulting in the formation of an organic sulfate, which in turn is hydrolyzed to the secondary alcohol. The alcohol is then separated from the acid solution and purified by conventional separation techniques usually involving a series of distillation and caustic washings. In a second process, that is for the production of ketone from the alcohol, a highly refined alcohol is passed in vapor phase over a solid catalyst at elevated temperatures in the range of about 650–900° F. to dehydrogenate the feed stock to the ketone. The crude ketone is then subjected to a number of product recovery steps. The two step ketone process of the type described is well known and is exemplified by the process for producing secondary butyl alcohol from n-butenes disclosed in U.S. Patent 2,514,291 and the process for converting secondary butyl alcohol to methyl-ethyl ketone in U.S. Patent 2,835,706.

The problem inherent in the conventional two stage production of ketones includes the necessity for separation, recovery and generation of both intermediate products, the duplication of process apparatus and equipment, and the need for large scale acid reconcentration.

The conversion of olefins to ektones by electrolytic oxidation is known in the art; such processes include processes herein before set forth which comprise the adsorption of the olefin in 85–95 wt. percent sulfuric acid, hydrolyzing the sulfuric acid product contained to the alcohol, purifying the alcohol and subjecting the purified alcohol to anodic oxidation. Another method known in the art is a process set forth in U.S. Patent 1,365,053 which discloses a process of producing ketones from olefins by adsorbing an olefin in highly concentrated sulfuric acid, such as 98 wt. percent of fuming sulfuric, to produce a sulfated material and then exposing the sulfated material to electrolytic oxygen, especially nascent oxygen, to afford a product consisting of a ketone and fatty acids. The problem inherent in the prior art process for the production of methyl ethyl ketone, herein after called MEK, has been that during the anodic oxidation of the organic feed quantities of acetic acid are produced.

It has now been discovered that MEK can be selectively produced from butene-1 without the formation of acetic acid by contracting butene-1 with aqueous sulfuric acid at a porous anode of an electrolytic cell. The anodic oxygenation step of the instant process may be carried out in either a fuel cell type electrochemical reactor with a simultaneous generation of electrical energy or in an electrochemical cell or reactor with a net consumption of electrical energy which must be supplied from an outside source. In both types of reactors the organic feed stock which is to be oxidized is brought into dual contact with the aqueous acid electrolyte and a porous anode of the electrolytic cell. The butene-1 is fed into the electrolytic cell so as to contact one side of the anode and the aqueous electrolyte is introduced into the cell so as to contact the opposite side of the anode, thereby permitting the butene-1 and the electrolyte to make dual contact at the electrolyte surface of the anode. In the fuel cell, the reaction is initiated by admitting an oxidizing gas into dual contact with the cathode and the electrolyte which results in the reduction of the oxidizing gas and the formation of water thereafter with the hydrogen ions present in the electrolyte. Conduction means are provided between the anode and cathode, external to the electrolyte, providing for a net flow of electrons to the cathode after the action is initiated. In the electrolytic cell, i.e., the power driven cell, the reaction differs in that it is initiated by admitting a direct current to the electrodes of the cell; in an electrolytic cell the use of an oxidizing gas is unnecessary.

The cells employed herein may be referred to as electrochemical cells it being understood such term defines a class of cells which includes both a power generating fuel cell and a power consuming hydrogen evolving electrolytic cell.

It has now been discovered that MEK can be produced from butene-1 without the disadvantage of simultaneously producing fatty acids by electrolytic oxydation in a cell employing a porous anode situated in the electrochemical cell so as to divide the cell into at least two compartments. One compartment is filled with the butene-1 to be oxidized and the other compartment is filled with aqueous electrolyte. A cathode is placed in the electrolyte compartment. The butene-1 can be fed into the fuel side as a gas, dissolved in a suitable solvent or as a liquid under pressure. Preferably the butene-1 is introduced into the fuel compartment as gas.

The porous electrodes of this invention may comprise any of the porous electrodes known to the art, such as carbon electrodes or ion exchange membranes having catalytic metal deposited therein and such structure subsequently being carbonized. In some porous electrodes, the pore sizes will vary so that some pores will have very small diameters allowing the liquid electrolyte to enter by capillary action and some pores will have larger diameters which will be occupied by the gaseous reactant. This is a desirable feature since it increases the effective contact area between the fuel and the electrolyte; that is, the liquid electrolyte enters the very small pores (minor pores) and the fuel enters the larger pores (major pores) which allows the fuel and electrolyte to make contact at the interior of the anode as well as at the face, thereby effectively increasing the contact area between fuel and electrolyte. However, anodes having uniform pore diameters can also be effectively utilized in the process. If an anode having uniform pore diameters is utilized, the fuel will occupy the pores and the contact with the electrolyte will be at the face of the anode at the electrolyte side of the anode.

I is the object of this invention to provide a process for the production of MEK without the disadvantage of simultaneously producing a fatty acid.

It is a further object of this invention to provide a source of pure hydrogen during the production of MEK by the anodic oxidation of butene-1 in a power driven cell. Such MEK being produced without the disadvantage of the simultaneous production of fatty acid.

These and other advantages of invention will become apparent from the following description of the drawings.

Figure 1:
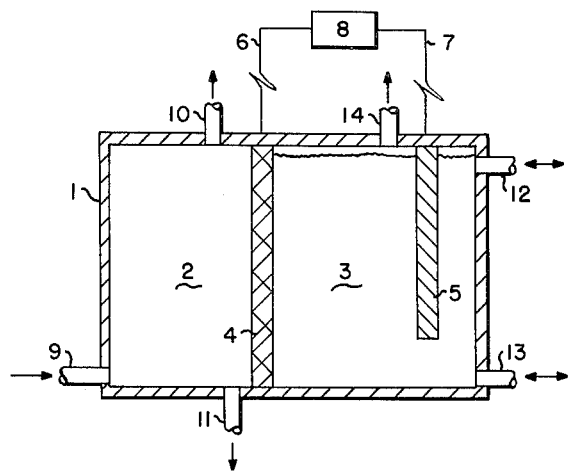
FIGURE 1 depicts a schematic vertical cross section of a typical electrochemical reactor or cell for the production of MEK according to this invention.

Referring now to FIGURE 1 which shows a container 1, which is composed of a nonconductive, nonporous material, said container creating a chamber which is divided into compartments 2 and 3 by a porous anode 4, fuel compartment 2 during the operation of the cell will be filled with butene-1, electrolyte compartment 3 during the operation of the cell will be filled with an aqueous electrolyte such as sulfuric acid or phosphoric acid. Cathode 5 is situated in electrolyte compartment 3, electrical conduction means 6 and 7 external to the electrolyte compartment connect the anode and cathode to an external power source 8 (or in the case of fuel cell conduction means 6 and 7 connect the anode and cathode through an external resistance such as a motor). The container 1 is provided with inlet means 9 for introducing the butene-1 into fuel chamber 2, and outlet means 10 to allow the escape of any $CO_2$ produced during the oxidation of the butene-1, said outlet means 10 can be provided with suitable valve means (not shown to prevent the escape of any substantial part of the fuel if gaseous butene-1 is so utilized. Outlet means 11 can be used for removal of MEK and flushing and washing the cell when necessary. Liquid conduction means 12 and 13 can be used for the purposes of introducing the aqueous electrolyte to the electrolyte compartment 3 and for circulating the aqeous electrolyte to a recovery tank (not shown), so as to provide a means for removing any MEK that can be adsorbed in the electrolyte. The MEK adsorbed in the electrolyte can be removed by any of the conventional processes such as gas stripping. Outlet means 14 is for the removal of hydrogen formed during the reaction conducted in a power driven cell or for water vapor formed during the reaction in a fuel cell. Liquid conduction means 12 or 13 can also be used to add water to electrolyte as needed.

Figure 2:
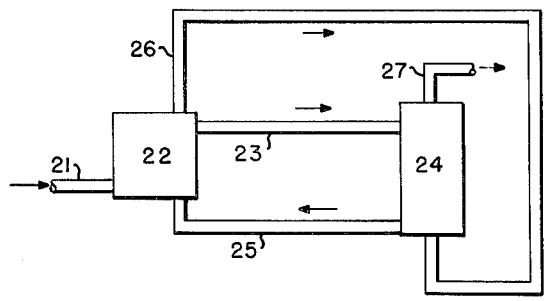
FIGURE 2 is a flow plan for processing butene-1 to MEK without the disadvantage of the simultaneous production of a fatty acid.

Referring now to FIGURE 2, there is shown a flow plan for processing butene-1 to MEK these show an inlet means 21 for admitting butene-1 into electrochemical reactor 22, having a porous anode (not shown dividing reactor 22 into a fuel chamber and an electrolyte chamber and outlet means 23 for cycling the electrolyte from reactor 22 to separation chamber 24. Recycle means 25 is provided for returning the electrolyte to reactor 22. Fluid conduit means 26 is provided for removing the hydrogen formed during the anodic oxidation of the butene-1 from reactor 22 to separation chamber 24. The hydrogen is used in separation chamber 24 to remove MEK from the electrolyte. Outlet means 27 is provided for removing the hydrogen MEK mixture from separation chamber 24. The hydrogen MEK mixture can be separated into its parts by any conventional means to give pure hydrogen and pure MEK.

The aqueous sulfuric acid electrolyte is about 8 to about 12 M preferably about 9.5 to 11 M and most preferably 10 M. The reaction is conducted at a temperature of about 150 to 180° F., most preferably at 165 to 175° F.

This invention will be more fully understood from the following examples which are for the purpose of illustration only and should not be construed as limitations upon the scope of the invention as set forth in the claims.

*Example 1*

An electrolytic cell having a porous carbon electrode situated so as to divide the cell into a fuel chamber and a catholyte chamber was utilized in this example. The cathode comprised a platinum screen electrode. The cell was driven by a power source, giving at the electrodes, a current density of 10 amps. per sq. ft. Butene-1 was fed into the fuel compartment as a gas. 10 M sulfuric acid was introduced into the catholyte compartment for use as the electrolyte. The reaction temperature was maintained at about 172° F. The product selectivity from the butene-1, based on the butene-1, was 92.3 MEK and 7.7% $CO_2$. No acid was formed.

*Example 2*

MEK was produced by feeding gaseous butene-1 into an electrolytic reactor, said reactor was driven by an external power source furnishing direct current to the reactor. A porous anode divided each cell of the reactor into a fuel chamber and a electrolyte chamber. The electrolyte chamber was filled with 10 M sulfuric acid. A platinum screen electrode was immersed into electrolyte to serve as the cathode. The current density of the electrode was maintained at about 10 amps. per sq. ft. The temperature of the electrolyte was maintained at about 175° F. The electrolyte was cycled from the reactor to a gas stripping chamber and returned from the gas stripping chamber to the electrolyte chamber of the reactor. Hydrogen formed during the reaction was removed from the electrolyte chamber to the gas stripping chamber and was used to strip the MEK from the circulating electrolyte. The hydrogen MEK mixture was removed from the stripping chamber and separated by conventional means. The product selectivity based on the amount of butene-1 was 88.7% MEK and 11.3% $CO_2$. No fatty acid was formed during the reaction.

What is claimed is:

1. A process for the electrochemical production of methyl-ethyl ketone without the simultaneous production of substantial quantities of fatty acid by-products which comprises simultaneously contacting butene-1 with an aqueous sulfuric acid electrolyte and an anodic oxidation porous anode, said electrolyte consisting essentially of about 8 to about 12 molar aqueous sulfuric acid, thereby selectively producing methyl-ethyl ketone.

2. A process as defined by claim 1 wherein said butene-1 is in the gaseous state.

3. In a process wherein methyl-ethyl ketone is produced by electrochemical oxidation of butene-1 in an electrolytic cell, said cell being divided into a fuel chamber and an electrolyte chamber by means of a porous anode, the improvement which comprises simultaneously contacting said porous anode with butene-1 from the fuel chamber and an aqueous sulfuric acid electrolyte from the electrolyte chamber, said electrolyte consisting essentially of about 8 to about 12 molar aqueous sulfuric acid, thereby selectively producing methyl-ethyl ketone.

4. In a process for the electrochemical production of methyl-ethyl ketone without the simultaneous production of fatty acid by-product, wherein butene-1 is oxidized at the anode of an electrochemical cell, said cell being divided into a fuel chamber and an electrolyte chamber by means of a porous carbon anode, the improvement which comprises maintaining a current density of about 10 amps./sq. ft. at said anode; feeding gaseous butene-1 into said fuel chamber; feeding 10 molar sulfuric acid into said electrolyte chamber; simultaneously contacting said anode with said butene-1 and said acid, thereby selectively producing methyl-ethyl ketone.

References Cited by the Examiner

UNITED STATES PATENTS 3,147,203   9/1964   Klass _____ 204—80

JOHN H. MACK, *Primary Examiner.*